3,468,854
Patented Sept. 23, 1969

3,468,854
RESINS AND THEIR PRODUCTION
Edwin E. Royals, Pensacola, Fla., assignor to Tenneco Chemicals, Inc., a corporation of Delaware
No Drawing. Filed Oct. 21, 1965, Ser. No. 500,319
Int. Cl. C08g 17/007, 30/12
U.S. Cl. 260—78.5      15 Claims

ABSTRACT OF THE DISCLOSURE

Unsaturated polyesters prepared by reacting allo-ocimene diepoxide with 0.5 to 1 mole of dicarboxylic acid per mole of diepoxide until from 0.75 to 1.75 moles of water are formed.

The polyesters have molecular weights ranging from 1,000 to 15,000.

---

The present invention relates to novel polymeric unsaturated hydroxy ester resins and to the production of such resins from allo-ocimene diepoxide and polybasic organic acids.

It has been discovered that allo-ocimene diepoxide can be reacted with polycarboxylic organic acid compounds to produce polymeric esters having a molecular weight of at least 500 and preferably having a molecular weight greater than 5000. Allo-ocimene diepoxide contains two epoxy groups and when reacted with polybasic organic acids, the two epoxy groups react with carboxyl groups of different polybasic acid moieties to form a polyester-type chain.

Allo-ocimene diepoxide may be represented by the formula

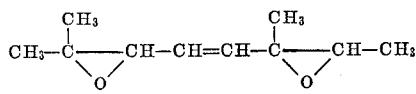

it being understood that this formula includes the stereochemical isomers.

When a polycarboxylic acid, for example, adipic acid, is reacted with the allo-ocimene diepoxide, the resulting resin appears to be primarily a linear polymeric hydroxy ester of the following type

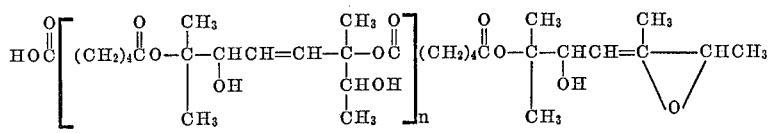

wherein $n$ has an average value greater than 1. The above-mentioned structure is not necessarily correct in detail as each epoxy group of the allo-ocimene diepoxide may undergo ring opening in either direction.

In the polyester formula shown, the hydroxyl groups are shown on the 3- and 7-carbon atoms of the diepoxide residue. If each of the epoxy rings,

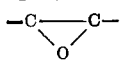

opens in the opposite direction, which they may do, then the hydroxyl groups would be on the carbon atoms in the 2- and 6-positions. The linear type polyester resin may be used as such or may be subjected to further treatment to remove water which is evolved. If the resin is subjected to this treatment, the maximum theoretical amount of water which may be removed approaches 2 moles of water per gram mole of diepoxide. In general, the maximum amount of water removed is up to 1.75 gram moles and preferably is in the range of from 1 to 1.5 gram moles per gram mole of reacted (chemically combined) allo-ocimene diepoxide, not necessarily the same number of gram moles of the diepoxide charged to the reaction. Thus, the structure of the final polymer differs in that some of the hydoxyl functions shown in the formula have reacted further through esterification or etherification involving dehydration, thereby eliminating part but not all, of the hydroxyl groups. Preferably, water is removed to produce more elastic, tougher resins; however, water is not necessarily removed.

The polymeric product may have a molecular weight falling within a wide range greater than 500 and preferably greater than 1000. The preferred resins are those having a molecular weight within the range of 1000 to 15,000, although resins having molecular weights of 30,000 or higher are within the scope of the present invention.

The relative proportions of the reactants and the reaction conditions may be varied. The amount of acid actually reacting with the allo-ocimene diepoxide should be at least 0.5 mole of acid per mole of allo-ocimene diepoxide. Preferably, the amount of polybasic acid is at least 0.6 mole with the optimum results being obtained with about 0.8 mole of acid per mole of allo-ocimene diepoxide when it is desired to have a polymer containing relatively few unreacted carboxyl groups. The aforementioned mole ratios are the ratios of the ingredients which actually react. In carrying out the reaction, an excess of either acid or diepoxide may be charged, particularly for those ingredients which do not react too readily so that at the end of the reaction there is an excess of unreacted material. The larger amounts of acid are preferred when it is desirable to obtain polymers containing a relatively large amount of reactive carboxyl groups which can be further reacted with other materials such as alcohols.

The reaction proceeds in two stages. In the first stage the reactions involved are primarily esterification reactions and in the second stage water is formed in addition to some possible esterification and/or polymerization reactions. These reactions may be carried out at a temperature in the range of 80° C. to 190° C. Preferably the first stage of the process is carried out at an initial temperature of 85°–125° C. which is increased to a temperature of about 170° C. In the second stage the reaction product is heated to a temperature of 100°–190° C. to further react the ingredients, and the water formed earlier or formed entirely during the second stage is removed. Additional polymerization may take place during the second stage and some impurities may be removed along with the water. Preferably the removal of water is effected at a temperature in the range of 125°–190° C. under submatmospheric pressure below 10 mm. of Hg absolute with somewhat better results being obtained at pressures below 5 mm. The water may be removed at atmospheric pressure by distillation with or without an azeotroping liquid. The water removed will hereinafter be referred to as "water of dehydration" without limitation as to the precise chemical reactions involved, it being understood that the water is formed by the reaction of a hydrogen atom and a hydroxyl group ($H+OH \rightarrow H_2O$).

The polycarboxylic organic acid compound may contain two or three carboxyl groups and may be a saturated or unsaturated aliphatic polycarboxylic acid or an aromatic polycarboxylic acid. Representative but not the only di- and tri-carboxylic acid compounds which may be used are fumaric acid, maleic acid, phthalic acid, terephthalic acid, azelaic acid, adipic acid, tartaric acid, citric acid, the anhydrides of such acids, and mixtures thereof. The preferred acids are adipic and azelaic acids as these acids produce resins of higher molecular weight and resins which are tougher and more elastic. The other acids may be used when lower molecular weights and/or when more brittle resins are satisfactory or desirable. As used herein, the term "polycarboxylic acid compound" includes both the polycarboxylic acids containing 2 or 3 caboxyl groups as well as the existing anhydrides of such polycarboxylic acids.

In the following examples all parts and percentages are by weight and all calculated values are based on the formula previously set forth for the resin unless stated otherwise. The viscosity values set forth in the examples, unless stated differently, are relative and were determined by first dissolving the polymer in methyl ethyl ketone. The times of flow of the filtered solution and the pure solvent were then determined through an Ostwald viscosimeter. The relative viscosity, RV, is then defined as:

$$RV = \frac{t - to}{C}$$

where $t$ is the time of flow of the solution under consideration, $to$ is the time of flow of pure solvent, and C is the concentration in grams of polymer per 10 ml. of solvent. Generally, and unless stated differently, the value of C was about 0.2 g./10 ml. While the concentrations used were too high to relate viscosity directly to molecular weight, no such direct relationship was deemed necessary. RV determinations were made on polyethoxyethyl alcohol (carbowaxes) of known molecular weight ranges at similar concentrations and molecular weights were approximated from the comparative RV values of the polymers under investigation and the polyethoxyethyl alcohol polymers. The expression "redistilled" allo-ocimene diepoxide is used to indicate a substantially pure material obtained by distilling an allo-ocimene diepoxide product containing impurities and collecting a relatively pure middle fraction. The allo-ocimene diepoxide product containing some impurities could have been used.

Example 1

Redistilled allo-ocimene diepoxide, 101 g. (0.6 mole), was stirred in a flask under a water-cooled reflux condenser at 130° C. while 73 g. (0.5 mole) of adipic acid was added portionwise during a period of 1 hour. A reaction temperature of 125°–135° C. was maintained throughout the addition period. Reaction was evidenced by marked increase in viscosity and development of an amber color. Stirring was continued for 1 hour at 140°–150° C. after addition of the adipic acid was complete. No formation of free water was detectable during this phase of the reaction. The reaction mixture was allowed to stand overnight.

The reaction flask was fitted with a still head and pot distilled for 4 hours at 150°–160° C. (2 mm.) and 11 g. of a yellow liquid distillate evolved. On raising the pot temperature to 170°–180° C., evolution of uncondensed vapors, presumably water, occurred and the pressure of the system tended to rise to 5–6 mm. Hg absolute. The resulting reddish amber resin was allowed to cool.

The resin was found to be insoluble in water; partially soluble (gelation) in acetone, methyl ethyl ketone, and dioxane; virtually insoluble in benzene. It showed definite elastic memory and some drawability. A sample shattered on sharp impact with a hammer, although the same sample was elastic to slower stress.

The mass was digested over a weekend with 300 ml. of methyl ethyl ketone, then refluxed briefly to give a pourable gel. Evaporation of a sample of the gel from a water bath (100° C.) indicated the presence of 35% solids. The residual resin was washed with 100 ml. of benzene to give a swelled, rubbery solid.

Example 2

Adipic acid, 73 g. (0.5 mole), was melted and maintained at 150°–160° C. with stirring while 101 g. (0.6 mole) of redistilled allo-ocimene diepoxide was added portionwise during 30 minutes. Heating at 150° C. with stirring was continued for 1 hour. During this period, considerable quantities of water were formed in the system, sufficient to diminish the reaction temperature at constant amount of heat input.

A water trap was introduced and 100 ml. of xylene was added to the reaction mixture. The mixture reflux was effected for one hour. During this time, 4.5 ml. of water was collected in the trap. Reflux under the water trap was continued for a total of 12 hours, xylene (and water) finally being slowly withdrawn from the system to attain a final pot temperature of 180° C. for a brief period. A total of 12 ml. of water (1.3 mole equivalent) was collected during the entire run. The system cooled to a semisolid syrup, obviously containing low molecular weight material and unreacted adipic acid.

Example 3

A mixture of 101 g. (0.6 mole) of redistilled allo-ocimene diepoxide and 73 g. (0.5 mole) of adipic acid was stirred and heated to 85° C. An exotherm took hold at this point and was easily controlled to a maximum temperature of 100° C. by brief application of a cooling bath. The exotherm was over within 10–15 minutes. The system was then stirred for 3 hours during which time the temperature was gradually increased from 100° C. to a final value of 125° C. and then allowed to stand overnight. The reaction mixture at this point was light amber in color and qiute viscous. No water had been evolved.

The system was stripped for a total of 7 hours under vacuum (<1 mm.) and a pot temperature as follows: 1 hour at 100°–110° C., 1 hour at 110°–125° C., 2 hours at 125°–130° C., 2 hours at 130°–155° C., and 1 hour at 155°–170° C.

The resulting resin was poured while still hot into an aluminum tray. It was not as tough and elastic as that from Example 1, perhaps because of the lower stripping temperature. The resin had acid No. 85 (in ethanol), 90 (in acetone) and a molecular weight of 1210 and 1280 (elbullioscopic in dioxane). Infrared analysis showed the presence of: hydroxyl, $2.9\mu$; carbonyl, $5.8\mu$; alkene, weak, $6.15\mu$; tert. hydoxyl, $8.8\mu$; sec.-hydroxyl, $9.3\mu$; trans-alkene, $10.3\mu$. Terminal alkene and epoxide bonds were absent.

Total volatile materials evolved during the stripping operations were 11 ml. of organics and 7 ml. (0.38 mole) of water collected in a cold trap.

Example 4

A mixture of 168 g. (1.0 mole) of redistilled allo-ocimene diepoxide and 87.5 g. (0.6 mole) of adipic acid was stirred and warmed to 85° C. The resulting exotherm was controlled to a maximum temperature of 100° C. The exotherm was over in about 15 minutes. The system was then stirred for 3 hours at 125°–130° C. and for 3 hours at 155°–160° C., and then allowed to stand overnight. The reaction mixture at this point was medium amber in color, rather viscous, and completely homogeneous. There was no evidence of the presence of water in the system.

Stripping of the system to the point of rubberyness was rather lengthy, requiring 6 hours at 150°–160° C. (5 mm.) and 6 hours at 160°–170° C. (4 mm.). During the stripping operations there were collected 14 ml. (0.78 mole) of water and 18 ml. of volatile organics. The reaction mixture was poured while hot into an aluminum tray. It hardened to give a rather dark-colored, sticky, nonelastic resin.

An unfavorable feature of this run tending to produce a less desirable resin was the use of excess allo-ocimene diepoxide. The resin had acid No. 93.

Example 5

A mixture of 126 g. (0.75 mole) of redistilled allo-ocimene diepoxide and 109 g. (0.75 mole) of adipic acid was warmed to 85° C. with stirring, and the resulting exotherm controlled to a maximum temperature of 125° C. during a total reaction period of about 30 minutes. The acid no. at this point was 79. The system was stirred at 110° C. for 1.5 hours; acid No. 40. The system was then stripped for 3 hours at 135°–140° C. (10 mm.) and allowed to stand over the weekend; acid No. 43. Stripping was continued for 2 hours at 150°–180° C. (10 mm.), then 2 hours at 170° C. (4 mm.). The reaction mass became quite rubbery during the latter phase of the stripping operation; acid No. 58. The resulting resin could not be completely dissolved, but did form a pourable gel on digestion with two 250-ml. portions of acetone.

During the stripping operations of this reaction, there were formed 11 ml. (0.61 mole) of water and 18 ml. of volatile organics.

Example 6

A mixture of 117 g. (0.8 mole) of adipic acid and 168 g. (1.0 mole) of redistilled allo-ocimene diepoxide was stirred and warmed to 85° C. An exotherm commenced and raised the reaction temperature to 110° C. in about 10 minutes. Brief ice-bath cooling was employed at this point, holding the maximum exotherm temperature to 141° C. Stirring was then continued without further external heating or cooling of the reaction mixture. After 1 hour the temperature had dropped to 65° C. and stirring became impossible because of great viscosity. The system was then warmed just sufficiently to enable pouring into a wide-mouthed bottle. This resin showed acid No. 29; saponification No. 225; and RV, 29 (molecular weight, ca. 2,000).

A sample of this material was cured for 18 hours in an oven at 155°–160° C. and atmospheric pressure failed to develop toughness and elasticity.

Example 7

A mixture of 101 g. (0.6 mole) of redistilled allo-ocimene diepoxide and 73 g. (0.5 mole) of adipic acid was warmed to 85° C. and the resulting exotherm was allowed to proceed unchecked, reaching a maximum temperature of 150° C. The exotherm period lasted about 10 minutes, after which the reaction mixture was homogeneous, light amber in color, and contained no visible water phase.

The reaction mass was stirred for 1.5 hours while the temperature was raised from 125° C. to a final value of 150° C. under atmospheric pressure. A water phase began to appear during this stage of reaction. The reaction mixture was quite viscous, medium amber in color. The reaction vessel was equipped with a water trap, 200 ml. of p-cymene was added, and the system was refluxed with stirring for 3 hours. During this period 8.5 ml. (0.47 mole) of water was collected in the trap; the system (hot) was homogeneous and quite fluid. On cooling overnight, the system separated into two liquid phases, the lower phase being rather dark and somewhat viscous.

Reflux was continued for 7 hours, during which time an additional 5.0 ml. (0.28 mole) of water was collected. Water was still being evolved when the reaction was stopped, although the rate had become quite slow. About one-half of the p-cymene was removed from the reaction mixture by distillation at atmospheric pressure. A white, crystalline solid co-distilled with the p-cymene. This was identified as adipic acid, melting point 150°–151° C. The remainder of the p-cymene was removed by distillation under line vacuum (ca. 7 mm.). The residue was a very dark-colored, amber resin containing much crystalline material, presumably unreacted adipic acid. The residue was vacuum stripped for one hour at 160°–170° C. (2 mm.) to give a dark resin which was not investigated further.

Example 8

Redistilled allo-ocimene diepoxide, 202 g. (1.2 mole), was stirred at 100° C. while 146 g. (1.0 mole) of adipic acid was added in portions over a period of one hour. Each portion of adipic acid was permitted to go into solution (and apparently react) before the next addition was made. During the earlier additions, an exotherm maintained the reaction temperature to a maximum of 115° C. and during later addition, heating was necessary. The reddish amber color and viscosity increased as the reaction progressed. After addition was complete, the reaction medium was stirred at 130°–140° C. for one hour.

The system was then fitted with a still head and vacuum stripped for 2 hours: initial condition, 70° C. (10 mm.); final condition, 150° C. (12 mm.). After the system had stood overnight, vacuum stripping was continued for 6.5 hours at 1 mm., the temperature being progressively increased from 120° C. to 160° C. The system was again allowed to stand overnight and was finally stripped at full pump vacuum (<1 mm.), the temperature being raised to 175° C. during 1 hour and maintained at this value for 30 minutes.

Total volatiles trapped during these stripping operations were 17 ml. (0.94 mole) water and 20 ml. organics. The clear, reddish amber reaction product was poured while hot into an aluminum tray. The resin had acid No. 87, RV 61 (molecular weight about 5,000), and saponification No. 278 (calculated for structure of resin as previously set forth, 357).

Example 9

Redistilled allo-ocimene diepoxide, 202 g. (1.2 mole), was stirred and 146 g. (1.0 mole) of adipic acid was added portionwise during 1 hour, the temperature being maintained at 100° C. by the reaction exotherm. After addition was complete, the system was stirred at 120°–130° C. (20 mm.) for 2 hours. No organic material was distilled during this period and only a small amount of water was collected in the cold trap.

After standing overnight, the system was vacuum stripped at <1 mm.; a pot temperature of 125°–130° C. was attained during 2 hours, and this temperature was then maintained for 2 hours. The resulting resin was poured while hot into an aluminum tray. It cooled to a reddish amber, fairly soft, non-elastic resin. This resin was completely soluble in acetone and dioxane and was reprecipitated from these solvents by large volumes of heptane. The resin was insoluble in water and dilute aqueous bases. The resin, by analysis, was found to have acid No. 94 and RV 30.8 (molecular weight ca. 2,000).

Example 10

The reaction was run using equimolar proportions of allo-ocimene diepoxide (168 g., 1.0 mole) and adipic acid (146 g., 1.0 mole) for the purpose of following the course of reaction through analytical data. The procedure was very much as described for previous runs.

| Reaction Time (hours) | Temperature ° C. | Pressure (mm.) | Acid No. | Hydroxyl No. | RV |
|---|---|---|---|---|---|
| 1 | [1]100 | [2] | 163 | 32.6 | 16.6 |
| 3 | 100 | [2] | | | |
| 1 | 125–130 | [2] | 115 | 93.3 | 20.5 |
| 2 | 125–130 | [2] | 118 | 74.4 | 21.5 |
| 2 | 125–130 | [2] | | | |
| 2 | 125–130 | 50 | 131 | 60.5 | 20.9 |
| 1 | 130 | 25 | | | |
| 1.5 | 140 | 5 | 139 | 64.3 | 23.7 |
| 6 | 150–180 | 5 | 249 | 65.7 | 19.0 |

[1] Exotherm period.
[2] Atmospheric.

Example 11

The apparatus consisted of a 500 ml., 3-necked flask fitted with a pot thermometer, Teflon paddle stirrer and a total-condensation, partial-takeoff still head with water-cooled condenser. A cold trap was placed between the still head and pump for trapping of water.

A mixture of 168 g. (1.0 mole) of redistilled allo-ocimene diepoxide and 117 g. (0.8 mole) of adipic acid was charged into the reactor, the stirrer was started, and the system was evacuated to 5 mm. with the still head closed for total reflux. The reaction mixture was warmed to 85° C. and the resulting exotherm was controlled at 85–90° C. by intermittent use of an ice bath. The exotherm lasted for about 15 minutes, during which time the adipic acid went completely into solution to give a yellow-green viscous solution.

The pressure was dropped to full oil pump vacuum (<1 mm.) and the reaction mixture was stirred for 3 hours at 110°–120° C. Very little water or volatile organics were evolved during this period. An analytical sample was removed at this point and showed acid No. 77.6 (corresponding to 75.4% reaction of carboxyl functions) and RV 16.2 (molecular weight ca. 1,000).

The still head takeoff cock was now opened and the system was stripped for 1.5 hours at 150° C. (<1 mm.). The reaction mixture was found upon analysis to have acid No. 65.5 (79.1% reaction) and RV 24.3 (molecular weight ca. 1,500). Stripping was continued for 1 hour at hour at 150° C. (<1 mm.), and the system was allowed to stand overnight.

The reaction mixture was rewarmed to fluidity and a 51 g. sample was removed. Analytical: acid No. 64.4, RV 20.0. The remainder of the reaction mass was stripped for 1.25 hours at 160°–175° C. (<1 mm.), after which time the viscosity of the reaction mass rather abruptly increased, making further stirring impossible. The reaction mixture was poured while still hot into an aluminum tray. The cooled resin was light amber in color, tough, pliable, and elastic.

Analytical: acid No. 73.7, RV 9314 (molecular weight ca. 10,000), and saponification No. 366 (calculated for structure previously set forth, 357).

A 13-g. portion of the reaction sample removed prior to final stripping was dissolved in 45 ml. of ethylene dichloride. The solution was filtered and the filtrate was poured with vigorous stirring into 150 ml. of diisopropyl ether. The viscous polymer which precipitated was washed with 50 ml. of diisopropyl ether and dried by spin evaporation with hot air heating. This material showed acid No. 49.4 and RV 28.8 (molecular weight, ca. 2,000).

Example 12

A mixture of 84 g. (0.5 mole) of redistilled allo-ocimene diepoxide and 73 g. (0.5 mole) of adipic acid was stirred and warmed to 85° C. The resulting exotherm was controlled to a maximum temperature of 125° C. After the exotherm subsided, the reaction mixture was heated at 125°–130° C. for 2 hours, then allowed to cool to 60° C.

Pyridine, 250 ml., followed by 112 g. (1.1 moles) of acetic anhydride were added, and the resulting solution was stirred at 100° C. for 1 hour. After the reaction mixture had stood overnight, stirring at 100° C. was continued for 1 hour. Excess reactants (230 ml.) were distilled off at atmospheric pressure (maximum pot temperature, 140° C.) and the remainer (ca. 100 ml.) at 100 mm. The residual material was then vacuum stripped at 4 mm. and maximum pot temperature 120° C. Practically no volatile organics were distilled. The residue was poured while hot into an aluminum tray.

The resin was of low molecular eight, showed RV 20.6 (ca. 1,250 molecular weight); acid No. 113, 115; and ball and ring softening point, 36° C.

Example 13

The reaction of 101 g. (0.6 mole) of allo-ocimene diepoxide with 94 g. (0.5 mole) of azelaic acid was run as described for the adipic acid reaction under Example 8.

After the portionwise addition of azelaic acid was complete, the system was stirred at 140° C. for 2.5 hours. The viscous, amber-colored reaction mixture was then stripped for 1 hour under vacuum (ca. 5 mm.), the pot temperature being gradually increased to 170° C. and then held for 2 more hours at 170°–180° C. During this stripping period, the reaction mass became darker in color, water and organic volatiles were evolved (not trapped), and viscosity greatly increased. The material finally became rubbery and unstirrable. The resulting resin was digested to a pourable gel with 300 ml. of methyl ethyl ketone used in two portions.

Example 14

Redistilled allo-ocimene diepoxide, 101 g. (0.6 mole), was stirred at 90° C., and 75 g. (0.5 mole) of tartaric acid was added portionwise during 1 hour. An exotherm followed by occasional blower heating maintained a reaction temperature of 85°–90° C. Reaction was evidenced by appearance of a yellowish color and marked increase in viscosity. No water evolution was observed during this phase of the reaction. Following the final addition of tartaric acid, the reaction mass became unstirrable and 50 ml. of methyl ethyl ketone was added. Stirring was continued for 1.5 hours at 85°–90° C. The color darkened considerably during this period. After standing overnight, the reaction mixture was heated for 2 additional hours at 90°–100° C., then vacuum stripped for about 1 hour in a spin evaporator under vacuum (ca. 7 mm.) and a heating bath temperature of 90°–98° C. The residual resin was poured while hot into an aluminum tray. It was dark-colored, brittle, and apparently contained unreacted acid (crystalline material).

A similar run was made using 168 g. (1.0 mole) of allo-ocimene diepoxide and 75 g. (0.5 mole) of tartaric acid. With this higher ratio of allo-ocimene diepoxide, the necessity for use of a diluent was avoided. Quite similar final results, however, were observed.

Example 15

Redistilled allo-ocimene diepoxide, 101 g. (0.6 mole), was caused to react with 65 g. (0.5 mole) of itaconic acid according to the procedure set forth in Example 8.

The reaction product was stripped for 1.5 hours at 130–140° C. (1 mm.) and for 2 hours at 150°–160° C. (1 mm.). The resulting resin was poured while hot into an aluminum tray. It was reddish amber in color and brittle. The resin had acid No. 124 and RV 21 (ca. 1,300 molecular weight).

Example 16

On admixture of 10 g. each of redistilled allo-ocimene diepoxide and citric acid monohydrate, a spontaneous exotherm raised the temperature to 70° C. On warming to 110° C., the reaction mixture became black in color and quite fluid. The resin was not tested.

Example 17

A mixture of 101 g. (0.6 mole) of redistilled allo-ocimene diepoxide and 83 g. (0.5 mole) of terephthalic acid was stirred at 100° C. for 2 hours. There was little evidence of reaction and much terephthalic acid remained undissolved. The temperature was raised to 125° C. and stirring continued for 2 hours with little apparent change in result. The system was allowed to stand over a weekend.

The reaction mixture hardened on cooling, indicating that at least some reaction had taken place although much undissolved terephthalic acid remained. An additional 101 g. (0.6 mole) of allo-ocimene diepoxide was added. On bringing the reaction mixture up to temperature, the temperature inadvertently was allowed to rise to ca. 200° C. for a very short time. Some water was liberated during this overheating, but the color did not darken appreciably. Heating at 145° C. was continued for 1.5 hours and the resulting resin was poured while hot into an aluminum tray. It hardened to a medium amber, quite brittle resin, acid No. 3.8 and RV 22.7 (ca. 1,300 molecular weight).

The present resins may be used for many purposes for which resins are useful and may be used to produce pressure-sensitive adhesive coatings. Such a coating can be prepared by first forming a solution:

| | G. |
|---|---|
| Toluene | 600 |
| Copolymer of Example 1 | 100 |
| Polymerized dipentene resin, M.P. ca. 115° C. | 80 |
| 2,5-di-tert.-amylhydroquinone | 2 |
| Substituted phenol-formaldehyde resin | 20 |
| Total | 802 |

This solution can be applied to a suitable backing and dried to form pressure-sensitive adhesive tape. The amount of solution applied should be such that the dried film is about 1 ml. thick.

The present resins may be further reacted through the hydroxyl groups with monobasic acids including drying oil fatty acids to produce higher molecular weight resins having drying properties similar to alkyd resins. The polycarboxylic acid-allo-ocimene diepoxide resins produced with relatively large amounts of the acid and containing free carboxyl groups may be further esterified with either monohydric or polyhydric alcohols.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A polymeric polyester of allo-ocimene diepoxide reacted with organic polycarboxylic acid compound in a mole ratio of from 0.5 to 2 moles of acid compound per mole of diepoxide from which up to 1.75 moles of water of dehydration has been removed.

2. A polymeric polyester of allo-ocimene diepoxide reacted with organic polycarboxylic acid compound in a mole ratio of from 0.5 to 2 moles of acid compound per mole of diepoxide dehydrated in an amount of from 0.75 to 1.75 moles of water, said polymeric polyester having a molecular weight of at least 1000.

3. A polymeric polyester of allo-ocimene diepoxide esterified with from 0.6 to 1 mole of adipic acid per mole of diepoxide and dehydrated by the removal of from 1 to 1.5 moles of water of formation per mole of diepoxide, said polyester having a molecular weight in the range of from 3000 to 15,000.

4. A polymeric polyester of allo-ocimene diepoxide esterified with from 0.6 to 1 mole of azelaic acid per mole of diepoxide and dehydrated by the removal of from 1 to 1.5 moles of water of formation per mole of diepoxide, said polyester having a molecular weight in the range of from 3000 to 15,000.

5. A polymeric polyester of allo-ocimene diepoxide esterified with about 0.8 mole of adipic acid per mole of diepoxide and dehydrated by the removal of from 1 to 1.5 moles of water of formation per mole of diepoxide, said polyester having a molecular weight in the range of from 3000 to 15,000.

6. A polymeric polyester of allo-ocimene diepoxide esterified with about 0.8 mole of azelaic acid per mole of diepoxide and dehydrated by the removal of from 1 to 1.5 moles of water of formation per mole of diepoxide, said polyester having a molecular weight in the range of from 3000 to 15,000.

7. The method of producing unsaturated polymeric resins comprising heating and esterifying from 0.5 to 2 moles of polycarboxylic acid compound with about 1 mole of allo-ocimene diepoxide at a temperature of from 80° to 190° C., and heating the reaction product at such a temperature until from 0.75 to 1.75 moles of water are formed.

8. The method of producing unsaturated polymeric resins comprising heating and esterifying from 0.5 to 2 moles of polycarboxylic acid compound with about 1 mole of allo-ocimene diepoxide at a temperature of from 80° to 190° C., and further heating the reaction mixture at a temperature of from 100° to 190° C., at a pressure less than 10 mm. of mercury until from 1 to 1.5 moles of water of dehydration per mole of diepoxide have been formed.

9. The method of producing unsaturated polymer resins as claimed in claim 8 in which the polycarboxylic acid compound is an aliphatic dicarboxylic acid.

10. The method of producing unsaturated polymer resins as claimed in claim 8 in which the polycarboxylic acid compound is adipic acid.

11. The method of producing unsaturated polymer resins as claimed in claim 8 in which the polycarboxylic acid compound is azelaic acid.

12. The method of producing unsaturated polymer resins as claimed in claim 8 in which the polycarboxylic acid compound is terephthalic acid.

13. The method of producing unsaturated polymer resins as claimed in claim 8 in which the polycarboxylic compound is tartaric acid.

14. The method of producing unsaturated polymer resins as claimed in claim 8 in which the polycarboxylic acid compound is itaconic acid.

15. The method of producing polymeric resins comprising reacting an epoxide essentially composed of allo-ocimene diepoxide with 0.5 to 1 mole of dicarboxylic acid per mole of diepoxide until from 0.75 to 1.75 moles of water are formed.

References Cited

UNITED STATES PATENTS 3,073,786   1/1963   Kraft et al.
3,203,939   8/1963   Tinsley et al.

JOSEPH L. SCHOFER, Primary Examiner

J. KIGHT, Assistant Examiner